United States Patent [19]

Sigai et al.

[11] Patent Number: 4,874,984
[45] Date of Patent: Oct. 17, 1989

[54] FLUORESCENT LAMP BASED ON A PHOSPHOR EXCITED BY A MOLECULAR DISCHARGE

[75] Inventors: A. Gary Sigai, Lexington; Walter P. Lapatovich, Hudson; Michael N. Alexander, Lexington, all of Mass.

[73] Assignee: GTE Laboratories Incorporated, Waltham, Mass.

[21] Appl. No.: 179,815

[22] Filed: Apr. 11, 1988

[51] Int. Cl.$^4$ .......................... H01J 1/63; H01J 63/04
[52] U.S. Cl. .................................... 313/486; 313/637; 313/639; 313/642; 313/643; 252/301.4 R
[58] Field of Search ............... 313/486, 637, 639, 642, 313/643, 484; 252/301.4 R

[56] References Cited

U.S. PATENT DOCUMENTS

| | | | |
|---|---|---|---|
| 3,453,427 | 7/1969 | Leiga et al. | 250/42 |
| 3,992,645 | 11/1976 | Kaduk | 313/486 |
| 4,266,167 | 5/1981 | Proud et al. | 315/248 |
| 4,427,921 | 1/1984 | Proud et al. | 315/248 |
| 4,427,924 | 1/1984 | Proud et al. | 315/248 |
| 4,480,213 | 10/1984 | Lapatovich et al. | 315/248 |
| 4,492,898 | 1/1985 | Lapatovich et al. | 315/248 |
| 4,636,692 | 1/1987 | Lapatovich et al. | 315/248 |
| 4,647,821 | 3/1987 | Lapatovich et al. | 315/248 |

FOREIGN PATENT DOCUMENTS

| | | | |
|---|---|---|---|
| 0169048 | 9/1984 | Japan | 313/642 |
| 0641546 | 1/1979 | U.S.S.R. | 313/642 |

OTHER PUBLICATIONS

Keith A. Butler, Fluorescent Lamp Phosphors Technology and Theory, Penn. State Univ. Press, (1988), #4.3, p. 52.
Algird G. Leigg and John McInally, Enhancement of the 2062-521 Atomic-Iodine Line on an Iodine Inert-Gas Flashlamp, J. Optical Soc. Am., 57, (Mar. 1967), pp. 317-318.

Primary Examiner—Donald J. Yusko
Assistant Examiner—Michael Horabik
Attorney, Agent, or Firm—Ivan L. Ericson

[57] ABSTRACT

A fluorescent lamp based on a phosphor excited by a molecular discharge is described. The fluorescent lamp comprises a fluorescent lamp coated with a manganese doped magnesium aluminate phosphor on the inside surface of the lamp envelope. The fluorescent lamp contains corrosion resistant filamentary electron emitting electrodes. The fluorescent lamp produces a plasma which emits 206 nm radiation from the molecular discharge of the iodine containing molecular vapors and inert gas fill which in turn excites the phosphor to emit visible light.

4 Claims, 1 Drawing Sheet

FLUORESCENT LAMP BASED ON A PHOSPHOR EXCITED BY A MOLECULAR DISCHARGE

CROSS REFERENCE TO RELATED APPLICATION

A co-pending patent application Ser. No. 07/179,808, filed concurrently herewith, entitled "FLUORESCENT LIGHT SOURCE BASED ON A PHOSPHOR EXCITED BY A MOLECULAR DISCHARGE", and assigned to GTE Laboratories Incorporated assignee of the present application, concerns related subject matter of this application.

FIELD OF THE INVENTION

This invention relates to a fluorescent lamp. More particularly, this invention relates to a fluorescent lamp based on a phosphor excited by a molecular discharge.

BACKGROUND OF THE INVENTION

Low pressure electric discharges have been utilized for years to produce visible and ultraviolet emission. In most cases the plasmas have contained excited or ionized atomic species. The mercury-inert gas discharge, which emits primarily 254 nm radiation, is the classic example. The addition of molecules to discharges to enrich the visible spectrum is a well-studied art, as evidenced by metal halide lamps.

Because of the limitations of the emission spectra of mercury-inert gas discharge lamps and metal halide lamps, many efficient phosphors have limited applications because the peaks of their excitation spectra poorly match the output of the low pressure mercury discharge.

Therefore, the development of alternative intense ultraviolet sources offers new opportunities for use of both ne and established phosphors in lamps.

SUMMARY OF THE INVENTION

In accordance with one aspect of the present invention, a new and improved green emitting fluorescent lamp comprises a glass envelope having an inner wall. The inner wall of the glass envelope is coated with a manganese doped magnesium aluminate phosphor which emits visible light upon absorption of ultraviolet radiation of about 206 nm. The fluorescent lamp has corrosion resistant filamentary electron emitting electrodes. The glass envelope also encloses a fill material which forms a plasma during electrical discharge. The plasma emits ultraviolet radiation of about 206 nm during discharge.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

A new and improved fluorescent lamp has been developed which utilizes a well-known but little utilized phosphor, $MgAl_2O_4$:Mn, a Mn-doped spinel, excited by a molecular discharge provided by the fluorescent lamp. The green fluorescence of this phosphor peaks near 520 nm with a full width at half the maximum peak height of 35 nm. As can be seen from the excitation spectrum of FIG. 1, this phosphor cannot be excited effectively by 254 nm radiation.

Figure 1:
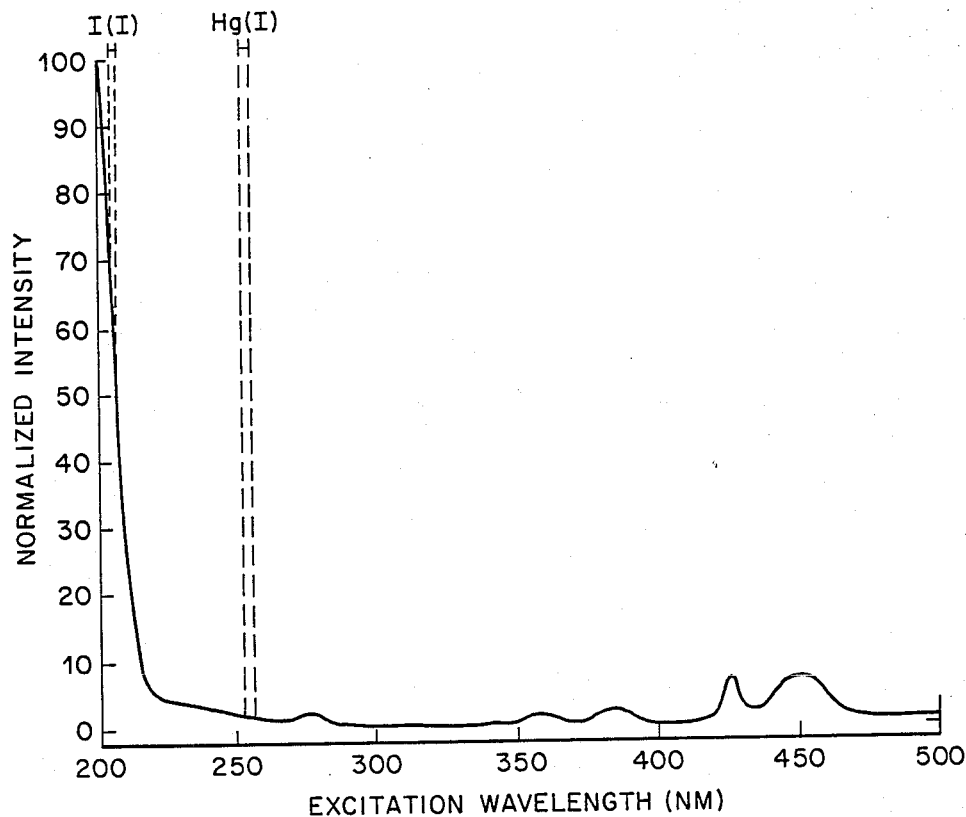
FIG. 1 illustrates an excitation spectrum of $(Mg_{0.995}Mn_{0.005})Al_2O_4$ for a green emission at 520 nm.

However, the $MgAl_2O_4$ emission is strongly excited by radiation having a wavelength near 200 nm, apparently because of host absorption with energy transfer to the $Mn^{2+}$. This strong absorption can be excited by iodine-containing discharges, as shown in FIG. 1, which schematically superimposes the emission of an iodine containing discharge on the $(Mg_{0.995}Mn_{0.005})Al_2O_4$ excitation spectrum. The intense 206 nm line of neutral atomic iodine $I(I):6s^2p_{3/2}-5p^2p°1/2$ nicely matches the $MgAl_2O_4$:Mn absorption. The weak excitation bands are due to $Mn^{2+}$ transitions from its ground state to its 3d levels. The strong band near 200 nm has been attributed to host absorption followed by energy transfer to $Mn^{2+}$. The dotted lines, depicted in FIG. 1, correspond to emission from an iodine source compared to that of a standard mercury discharge, respectively.

Molecular discharges emitting strongly at about 206 nm are easily produced in $I_2$ vapor, $HgI_2$, or other iodine containing molecular vapors. Through dissociation, the molecules act as donors of neutral atomic iodine which are intense UV radiators. Mn-doped spinel irradiated by electron excited $I_2$ discharge has exhibited efficient green $Mn^{2+}$ emission.

Figure 2:
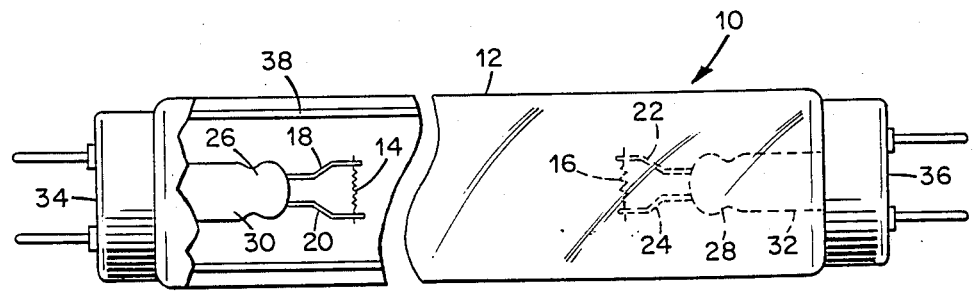
FIG. 2 illustrates a fluorescent lamp, partially in section, diagrammatically illustrating an embodiment of the invention.

Depicted in FIG. 2, fluorescent lamp 10 comprises an elongated sealed glass envelope 12 of circular cross section. Fluorescent lamp 10 has corrosion resistant filamentary electron emitting electrodes 14 and 16. Electrodes 14 and 16 may comprise iridium (Ir) coated with thorium oxide ($ThO_2$) or thoriated iridium, i.e., iridium embedded with thorium; or other equivalent electron emitting electrodes capable of surviving the relatively corrosive environment present in glass envelope 12. Electrodes 14 and 16 are supported by lead-in wires 18, 20 and 22, 24 respectively, which extend through glass presses 26, 28 in mount stems 30, 32 to the contacts in bases 34, 36 affixed to the ends of the lamp 10. Glass envelope 12 also encloses fill material which forms a plasma during discharge. The plasma emits ultraviolet radiation of about 206 nm during discharge. The fill material comprises an iodine containing molecular vapor and an inert gas selected from the group consisting of neon, argon, krypton, xenon, and mixtures thereof.

The interior of glass envelope 12 is coated with a layer of manganese doped magnesium aluminate phosphor 38 of the present invention.

A phosphor coating suspension is prepared by dispersing the phosphor particles in a water base system employing polyethylene oxide as the binder with water as the solvent.

The phosphor suspension is applied in the usual manner of causing the suspension to flow down the inner surface of envelope 12 and allowing the water to evaporate, leaving the binder and phosphor particles adhered to the envelope 12 wall. The phosphor coated envelope 12 is then heated in an oven to volatilize the organic components, manganese doped magnesium aluminate phosphor layer 38 remaining on the envelope 12 wall.

SPECIFIC EXAMPLE

The Mn-Doped Spinel Phosphor Synthesis

The preparation of the manganese-activated magnesium aluminate spinel ($Mg_{0.99}Mn_{0.01}Al_2O_4$) which can be used within the fluorescent lamp of the present invention employs the following starting materials: Al-(OH)$_3$ obtained from J. T. Baker Inc., MgO obtained from Morton Thiokol, Inc. and MnCO$_3$ (assay 46.32% Mn, theoretical 47.8%) obtained from the Chemical and Metallurgical Division of GTE Products Corporation.

The raw materials for the manganese-activated magnesium aluminate spinel ($Mg_{0.99}Mn_{0.01}Al_2O_4$) were thoroughly blended and fired in an alumina crucible in a furnace programmed to ramp from 700° C. to 1600° C. within ½ hour, hold at 1600° C. for 4 hours, and ramp down to 700° C. within ½ hour. All heating occurred in dry forming gas (5% H$_2$ in N$_2$). An alumina crucible containing MgO was placed upstream of the phosphor-containing crucible. Its purpose is to provide a saturated vapor pressure of MgO for the phosphor-containing crucible. Comparison between the experimentally observed weight loss (27.76%) and the theoretically predicted weight loss (27.63%) of the phosphor-containing crucible, based on conversion of the carbonate and hydroxide to their respective oxides, showed that no significant compositional change occurred.

After firing, the phosphor was crushed and sieved through a 325 mesh screen. The resulting screened phosphor had a white body color and was not excited by short- or long- wavelength mercury lamp excitation (hand lamp). X-ray analysis confirmed the presence of only the spinel structure.

An example of the phosphor batch weights is as follows:

| | |
|---|---|
| Al(OH)$_3$ | 62.33 gms. |
| MgO | 16.200 gms. |
| MnCO$_3$ | 0.488 gms. (actual, which took into account corrections for Mn assay) |
| Total | 79.01 gms. |

The weight of the resulting phosphor was 57.08 gms.

For this particular application the Mn concentration can be from about 0.5 to about 5 mole % Mn so that the formula would be ($Mg_{x-1}Mn_x$)Al$_2$O$_4$ wherein x is equal to or greater than 0.005 and equal to or less than 0.05. In the example, the amount of MnCO$_3$ corresponds to 1 mole % Mn.

The fill material comprises from about $3 \times 10^{-3}$ mg/cm$^3$ to about 0.5 mg/cm$^3$ of I$_2$ with the preferred value being about $6.73 \times 10^{-3}$ mg/cm$^3$ of I$_2$; from about $5.12 \times 10^{-3}$ mg/cm$^3$ to about 0.26 mg/cm$^3$ HgI$_2$ with the preferred value being about 0.13 mg/cm$^3$; HgI$_2$ and a fill gas of an inert gas such as selected from the group consisting of neon, argon, krypton, xenon, and mixtures thereof in the pressure range of about 0.01 to about 20 torr with the preferred value of about 2 torr.

The HgI$_2$ discharge produces atomic iodine spectral emission which matches well with the manganese activated magnesium aluminate absorption spectrum, resulting in a green emitting fluorescent lamp based on a manganese activated spinel phosphor when excited by the HgI$_2$ molecular discharge.

While there has been shown and described what is at present considered the preferred embodiment of the invention, it will be obvious to those skilled in the art that various changes and modifications may be made therein without departing from the scope of the invention as defined by the appended claims.

What is claimed is:

1. A green emitting fluorescent lamp comprising a glass envelope having an inner wall, said inner wall of said glass envelope being coated with a manganese doped magnesium aluminate phosphor which emits visible light upon absorption of ultraviolet radiation of about 206 nm, said fluorescent lamp having corrosion resistant filamentary electron emitting electrodes, and said glass envelope enclosing a fill material which forms a plasma emitting ultraviolet radiation of about 206 nm during electrical discharge, said fill material comprises an iodine containing molecular vapor and an inert gas selected from the group consisting of neon, argon, krypton, xenon, and mixtures thereof.

2. A fluorescent lamp in accordance with claim 1 wherein said manganese doped magnesium aluminate phosphor has an approximate formula $$MgAl_2O_4:Mn$$

3. A fluorescent light source in accordance with claim 2 wherein said approximate formula is $$(Mg_{1-x}Mn_x)Al_2O_4$$

wherein $$0.005 \leq x \leq 0.05.$$

4. A fluorescent lamp in accordance with claim 1 wherein said iodine containing molecular vapor selected from the consisting of molecular vapors of I$_2$, HgI$_2$, and mixtures thereof.

* * * * *